(12) United States Patent
Takahashi et al.

(10) Patent No.: US 12,734,898 B2
(45) Date of Patent: Sep. 15, 2026

(54) VEHICLE DRIVE DEVICE

(71) Applicants: MITSUBISHI JIDOSHA KOGYO KABUSHIKI KAISHA, Tokyo (JP); MEIDENSHA CORPORATION, Tokyo (JP)

(72) Inventors: Tsuyoshi Takahashi, Tokyo (JP); Kiminobu Terao, Tokyo (JP); Yosuke Morimoto, Okazaki (JP); Takuya Ogasawara, Okazaki (JP); Hiromichi Akiyama, Tokyo (JP); Dai Oono, Tokyo (JP)

(73) Assignees: MITSUBISHI JIDOSHA KOGYO KABUSHIKI KAISHA, Tokyo (JP); MEIDENSHA CORPORATION, Tokyo (JP)

( * ) Notice: Subject to any disclaimer, the term of this patent is extended or adjusted under 35 U.S.C. 154(b) by 280 days.

(21) Appl. No.: 18/693,390

(22) PCT Filed: Sep. 28, 2022

(86) PCT No.: PCT/JP2022/036089

§ 371 (c)(1),
(2) Date: Mar. 19, 2024

(87) PCT Pub. No.: WO2023/054437

PCT Pub. Date: Apr. 6, 2023

(65) Prior Publication Data

US 2024/0399882 A1 Dec. 5, 2024

(30) Foreign Application Priority Data

Oct. 1, 2021 (JP) ................................ 2021-162477

(51) Int. Cl.

| | |
|---|---|
| ***B60L 15/00*** | (2006.01) |
| ***B60K 1/02*** | (2006.01) |
| *B60K 1/00* | (2006.01) |

(52) U.S. Cl.
CPC .............. *B60L 15/007* (2013.01); *B60K 1/02* (2013.01); *B60K 2001/003* (2013.01); *B60L 2220/42* (2013.01)

(58) Field of Classification Search
CPC ............... B60L 15/007; B60L 2220/42; B60K 2001/003; B60K 1/02; H05K 7/20927;
(Continued)

(56) References Cited

U.S. PATENT DOCUMENTS

2015/0305188 A1* 10/2015 Maeda ..................... H05K 7/02 361/728
2023/0238911 A1* 7/2023 Kobayashi ............. H02P 29/68 318/471
2023/0328911 A1* 10/2023 Helwich ................. B60L 50/51 361/752

FOREIGN PATENT DOCUMENTS

JP 2017-184523 A 10/2017
JP 2021029059 A * 2/2021

OTHER PUBLICATIONS

International Search Report for PCT/JP2022/036089 (PCT/ISA/210) mailed on Nov. 29, 2022.

(Continued)

*Primary Examiner* — Edwin A Young
(74) *Attorney, Agent, or Firm* — Birch, Stewart, Kolasch & Birch, LLP

(57) ABSTRACT

The disclosed vehicle drive device (10) includes: left and right motors (1,2) that drive left and right wheels of the vehicle; a gearbox (3) that is sandwiched between the left and right motors (1,2); and an inverter (4) that is arranged in a mounting space (S) over the left and right motors (1,2) and the gearbox (3). The gearbox (3) forms, in conjunction with respective motor housings (11,12) of the left and right motors (1,2), a depressed portion (8) depressed downward. The inverter (4) includes a cover (15) that is in a flat-plate shape, is attached to a tray unit (16), and covers the capacitor (5) and a semiconductor module (6) from above the capaci- (Continued)

tor (5) and the semiconductor module (6). The capacitor (5) is attached to a lower surface of the cover (15) and is arranged in the depressed portion (8). The semiconductor module (6) is attached to the lower surface of the cover (15) and is displaced from each of the capacitor (5) and the rotating shafts (C) of the motors (1,2) when seen from above.

9 Claims, 9 Drawing Sheets

(58) Field of Classification Search
CPC ..................... H02K 7/116; F16H 57/02; F16H 2057/02026; F16H 2057/02034; F16H 2057/02052
See application file for complete search history.

(56) References Cited

OTHER PUBLICATIONS

Written Opinion of the International Searching Authority for PCT/JP2022/036089 (PCT/ISA/237) mailed on Nov. 29, 2022.

English translation of the International Preliminary Report on Patentability and Written Opinion of the International Searching Authority for International Application No. PCT/JP2022/036089, dated Apr. 2, 2024.

* cited by examiner

VEHICLE DRIVE DEVICE

TECHNICAL FIELD

The present disclosure relates to a vehicle drive device that drives left and right wheels of a vehicle using electricity of a battery.

BACKGROUND TECHNIQUE

Conventionally, vehicle drive devices have been known which drive left and right wheels of the vehicle with two motors (electric motors). For example, one of the proposed vehicle drive devices connects motors one to each of the left and the right wheels so that the left and the right wheels can be driven independently from each other. Such a vehicle drive device can generate a rotational speed difference and a torque difference between the left and the right wheels by making the driving forces of the left and the right motors different from each other. This improves the turning performance of the vehicle and the stability of the vehicle body while turning (see Patent Document 1).

PRIOR ART REFERENCE

Patent Document

[Patent Document 1] Japanese Laid-open Patent Publication No. 2017-184523.

SUMMARY OF INVENTION

Problems to be Solved by Invention

In the technique described in Patent Document 1, an inverter is installed on a partitioning wall that partitions an accommodating space of a reducer and an accommodating space of the inverter. With this structure, there is likely to be a surplus space above the inverter within the accommodating space of the inverter, which requires improvement for the compactness. In addition, an inverter includes various components such as a capacitor and a semiconductor module, some arrangements of which make it difficult to reduce the size of the inverter. For example, an arrangement that overlays the components of an inverter in the up-down direction tends to expand the height dimension of the inverter. Therefore, a demand has arisen for developing a vehicle drive device capable of compactly mounting an inverter in a limited space.

With the foregoing problems in view, one of the objects of the present disclosure is to provide a vehicle drive device capable of compactly mounting thereon an inverter. In addition to this object, actions and effects which are derived from each configuration of an embodiment to carry out the invention to be described below and which conventional technique does not attain are other objects of the present disclosure.

Means to Solve the Problem

The disclosed vehicle drive device includes: left and right motors that include respective rotating shafts extending in a left-right direction of a vehicle, are spaced apart in the left-right direction from each other, and drive left and right wheels of the vehicle; a gearbox that incorporates therein a gear mechanism amplifying torque of the left and right motors and transmitting the amplified torque to the left and right wheels, that is sandwiched between the left and right motors, and that forms, in conjunction with respective motor housings of the left and right motors, a depressed portion depressed downward; and an inverter that is arranged in a mounting space over the left and right motors and the gearbox and that includes a capacitor smoothing electric power and a semiconductor module including a plurality of switching elements. The inverter includes a tray unit that accommodates the capacitor and the semiconductor module, and a cover that is in a flat-plate shape, is attached to the tray unit, and covers the capacitor and the semiconductor module from above the capacitor and the semiconductor module. The capacitor is attached to a lower surface of the cover and is arranged in the depressed portion. The semiconductor module is attached to the lower surface of the cover and is displaced from each of the capacitor and the rotating shafts when seen from above.

Effects of Invention

According to the present disclosure, it is possible to provide a vehicle drive device capable of compactly mounting an inverter because space can be effectively used by a layout that suspends a capacitor and a semiconductor module on a cover.

EMBODIMENTS TO CARRY OUT INVENTION

1. Structure

Figure 1:
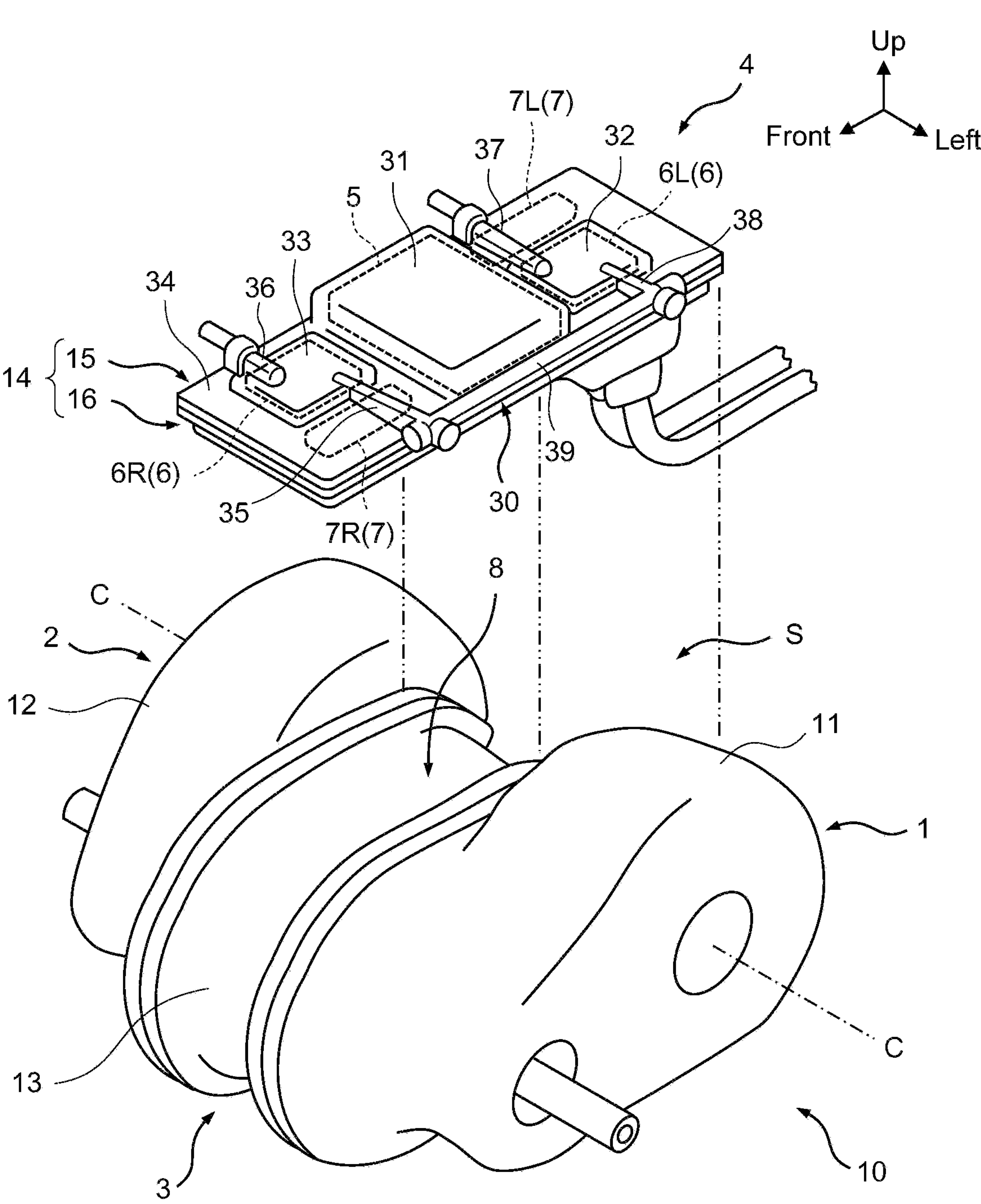
FIG. 1 is an exploded perspective diagram illustrating of a vehicle drive device according to an embodiment.

FIGS. 1-4 and FIGS. 7-9 are diagrams illustrating the structure of a vehicle drive device 10 according to the present application example (embodiment). In the drawings, front-rear, left-right, and up-down represent directions determined with reference to the driver of the vehicle on which vehicle drive device 10 is mounted. As shown in FIG. 1, the vehicle drive device 10 is provided with a left motor 1, a right motor 2, a gearbox 3, and an inverter 4. The left and the right motors 1,2 (left motor 1, right motor 2) are electric motors that receive power from a battery (not illustrated) mounted on the vehicle and drive left and right wheels of the vehicle.

The left and the right motors 1,2 have rotating shafts C extending in the left-right direction (in width direction of the vehicle) (in the drawing, the rotational center of each rotating shaft indicated by a dashed-dotted line is denoted by a reference sign C), and are arranged coaxially and spaced apart from each other in the left-right direction. The left motor 1 is connected to a power transmission path connected to at least the left wheel shaft. Similarly, the right motor 2 is connected to a power transmission path connected to at least the right wheel shaft. In an electric vehicle or a hybrid vehicle mounted thereon another driving motor or an internal combustion engine, the left and the right motors 1,2 function as a yaw moment generating source that generates turning force by increasing or decreasing at least driving force and braking force of left and right wheels. Further, in an electric vehicle not mounted thereon any other driving motor, the motors 1,2 also have a function as a driving source of the vehicle in addition to the above-described function.

Figure 2:
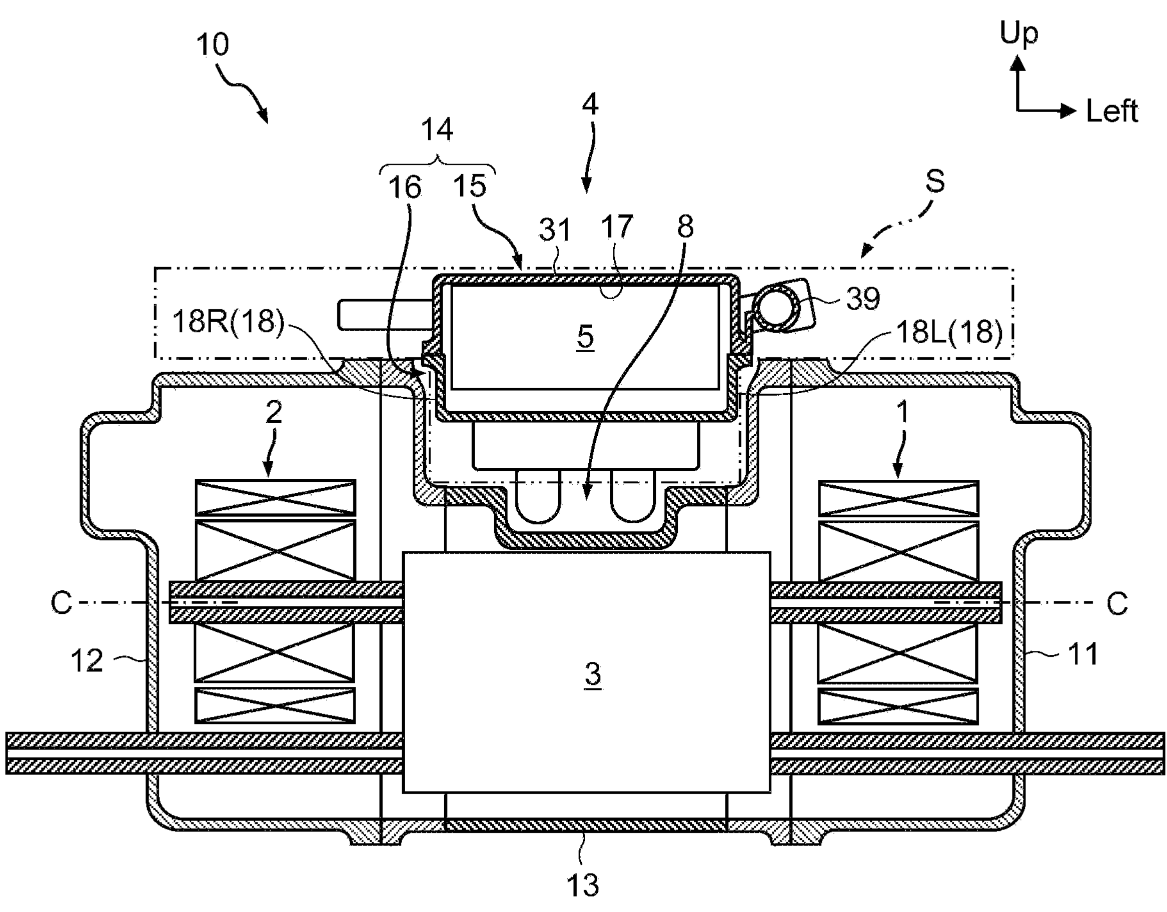
FIG. 2 is a sectional view illustrating an internal structure of the vehicle drive device of FIG. 1.

The left and the right motors 1,2 of the present embodiment are configured the same as each other. Each of the motors 1,2 has a configuration incorporating therein motor elements such as a stator, a rotor, and a motor shaft. These elements are accommodated in left and right motor housings 11,12 (left motor housing 11, right motor housing 12) that form the exteriors (that incorporates the motors 1,2 therein) of the respective motors 1,2, as shown in FIG. 2. The motor housings 11,12 are configured such that the bottoms of the respective bottomed cylindrical member face outward in the left-right direction and end bells are attached to apertures on the respective center sides in the left-right direction.

The stator is, for example, a stator which has a structure that winds a coil around a laminated iron core formed by depositing electromagnetic steel sheets each coated with an insulating coating and is fixed to the corresponding motor housing 11 or 12. The rotor is, for example, a cylindrical rotor in which a permanent magnet is inserted into a laminated iron core formed by depositing electromagnetic steel sheets each coated with an insulating coating and is loosely inserted into the inside of the stator concentrically with the central axis of the stator and fixed to an axial motor shaft. By changing the frequency of the AC power supplied to the stator, the rotational velocity of the magnetic field inside the stator is changed, and the angular velocity of the rotor and the motor shaft are changed. One end of the motor shaft is connected to the gearbox 3. The left motor 1 is arranged on the left side of gearbox 3 while the right motor 2 is arranged on the right side of the gearbox 3.

The gearbox 3 is a driving force transmission device sandwiched between the left and the right motor housings 11, 12. The gearbox 3 includes a gearbox housing 13 that forms an exterior and a gear mechanism incorporated therein. The gear mechanism is a mechanism that amplifies the torques of the left motor 1 and the right motor 2 and transmits amplified torques to the left and the right wheels. In addition, the gear mechanism includes a mechanism (e.g., a differential gear mechanism, a planetary gear mechanism) for generating a torque difference between the left wheel shaft and the right wheel shaft.

Figure 3:
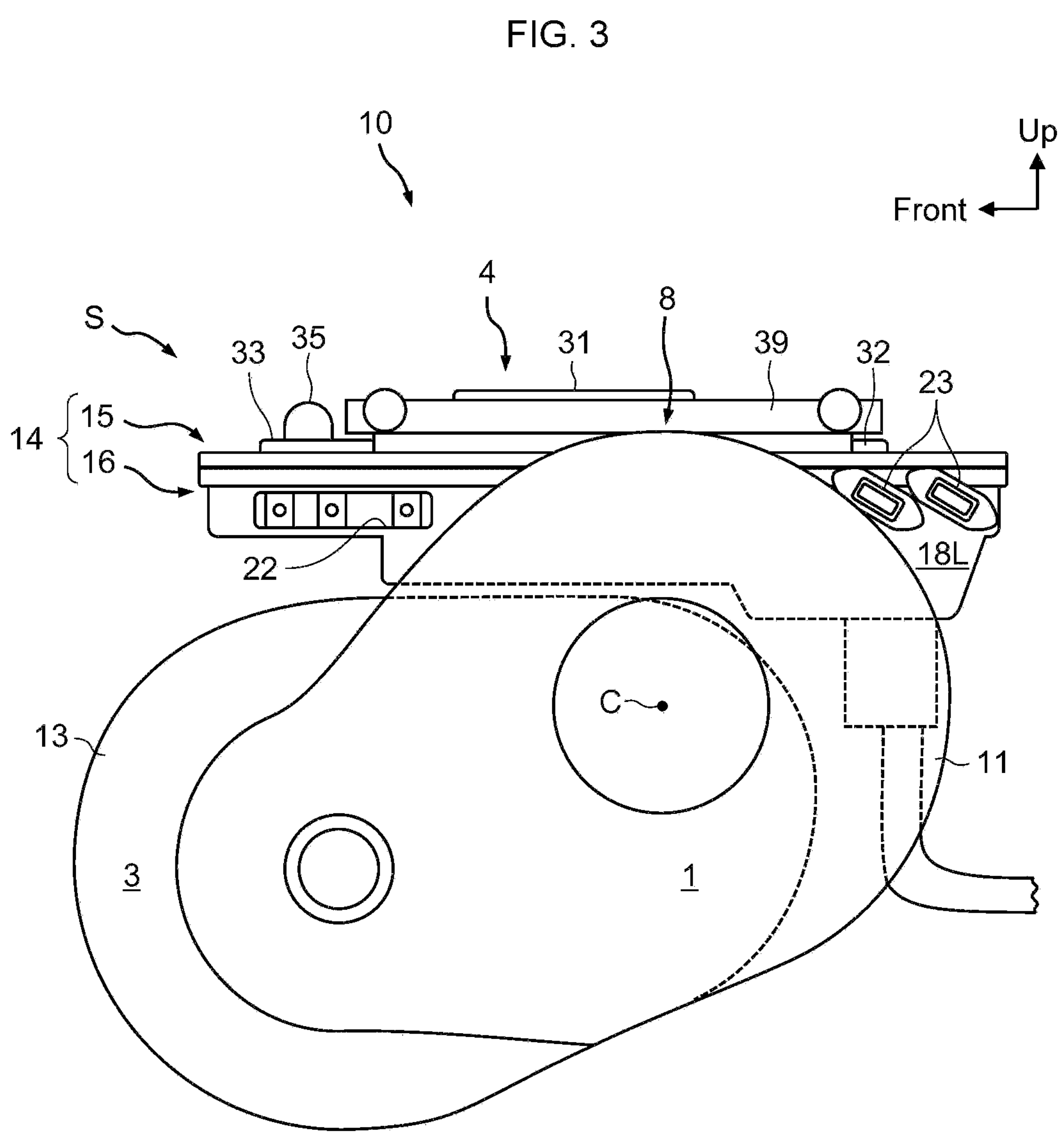
FIG. 3 is a left surface view illustrating the vehicle drive device of FIG. 1.

The gearbox housing 13 of the present embodiment is offset downward from the left and the right motor housings 11, 12. Specifically, as shown in FIG. 3, the positional relationship between the left and the right motor housings 11, 12 and the gearbox housing 13 is set such that the gearbox 3 is displaced downward and forward (radial direction of the left and the right motors 1,2) on the basis of the rotating shafts C of the left and the right motors 1,2 when seen from the side. This layout causes gearbox 3 to form, in conjunction with the motor housings 11, 12, a depressed portion 8 that recesses downward. As shown in FIGS. 2 and 3, the depressed portion 8 is in a basin shape depressed downward between the left and the right motor housings 11,12.

The inverter 4 is a converter (DC-AC inverter) that mutually converts the power (DC power) of a DC circuit and the power (AC power) of the AC circuits on the side of the motors 1,2. This inverter 4 has a function of converting DC power into AC power and supplying the converted AC power to both the left and the right motors 1,2. The inverter 4 is arranged in a mounting space S (two-dot chain line in FIG. 2) over the left and the right motors 1,2 and the gearbox 3. This mounting space S is a space formed between the vehicle drive device 10 and the surrounding equipment or the vehicle body at a position where the vehicle drive device 10 is mounted, and is in a T-shape including the depressed portion 8 between the motor housings 11,12 and a space over the motor housings 11,12 when seen from the front side.

As shown in FIG. 3, in the present embodiment, the upper ends of the motor housings 11,12 are located right overhead the rotating shafts C of the motor 1,2 (i.e., the part overlapping the rotating shafts C when seen from above). Therefore, the part (the space corresponding to the lateral bar of the T shape) above the motor housings 11,12 among the mounting space S is minimized at a portion right overhead the rotating shafts C. In other words, the mounting space S is secured more largely at a position deviated from the rotating shafts C than at a position overlapping the rotating shafts C when seen from above.

As shown in FIG. 1, the inverter 4 includes a capacitor 5 for smoothing electricity and semiconductor module 6 including multiple switching elements. The capacitor 5 and the semiconductor module 6 are incorporated in an inverter case 14 forming the exterior of the inverter 4. In this embodiment, current sensor 7, which is one of the components of the inverter 4, is also incorporated in the inverter case 14 together with the capacitor 5 and the semiconductor module 6.

The inverter case 14 is arranged in the mounting space S and is fixed to the left and the right motor housings 11, 12. In addition, the inverter case 14 is formed by a combining a tray unit (lower inverter case) 16 that accommodates the capacitor 5 and the semiconductor module 6, and a plate-shaped cover (upper inverter case) 15 that covers the capacitor 5 and the semiconductor module 6 from above. The tray unit 16 of the present embodiment is provided separately from the gearbox 3 (gearbox housing 13). Alternatively, the tray unit 16 may be provided integrally (as part of the gearbox housing 13) with the gearbox 3.

The capacitor 5 is an electronic component having a larger thickness (size in the up-down direction) than the remaining components (i.e., the semiconductor module 6 and the current sensor 7) of the inverter 4. In the present embodiment, one capacitor 5 is shared by both the left and the right motors 1,2. In a current controlled inverter, the capacitor 5 is disposed on an electricity supply line of AC power obtained by conversion in the semiconductor module 6, while in a voltage controlled inverter, the capacitor 5 is disposed on an input-side of DC power. The capacitor 5 functions as a kind of filter to stabilize the current supplied to the motors 1,2.

The semiconductor module 6 is a power module formed by forming a three-phase bridging circuit including multiple switching elements, diodes, and the like on a substrate (substrate for an electronic circuit). By intermittently switching the connecting states of the respective switching elements, the DC power is converted into three-phase AC power. Examples of the switching elements include semiconducting devices such as thyristors, IGBTs (Insulated Gate Bipolar Transistors), and power MOSFETs (Metal Oxide Semiconductor Field-Effect Transistors).

The semiconductor module 6 of the present embodiment includes (a pair of) left and right modules 6L,6R (left module 6L, right module 6R) used one for each of the left and the right motors 1,2. The left and the right modules 6L, 6R are provided separately from each other. The left module 6L is a dedicated semiconductor module to the left motor 1. The AC power generated by the left module 6L is supplied to the left motor 1. On the other hand, the right module 6R is a dedicated semiconductor module to the right motor 2. The AC power generated by the right module 6R is supplied to the right motor 2.

Like the semiconductor module 6, the current sensor 7 includes a pair of left and right sensors 7L,7R (left sensor 7L, right sensor 7R) used one for each of the left and the right motors 1,2. The left and the right sensors 7L, 7R are also provided separately from each other.

In relation to the arrangement of the inverter 4, at least the capacitor 5 having the largest thickness is arranged at the depressed portion 8 (in the depressed portion 8 or right overhead the depressed portion 8). Further, the semiconductor module 6 is arranged at a position different from the both the capacitor 5 and the respective rotating shafts C when seen from above. In addition, the current sensor 7 is arranged at a position different from any of the capacitor 5, the semiconductor module 6, and the rotating shafts C when seen from above. Therefore, when seen from above, the capacitor 5 is located between the left and the right motor housings 11, 12, and the semiconductor module 6 and the current sensor 7 are displaced in the front-rear direction or the left-right direction with respect to the capacitor 5 and the rotating shafts C and therefore do not overlap with the capacitor 5 and the rotating shafts C.

Figure 4:
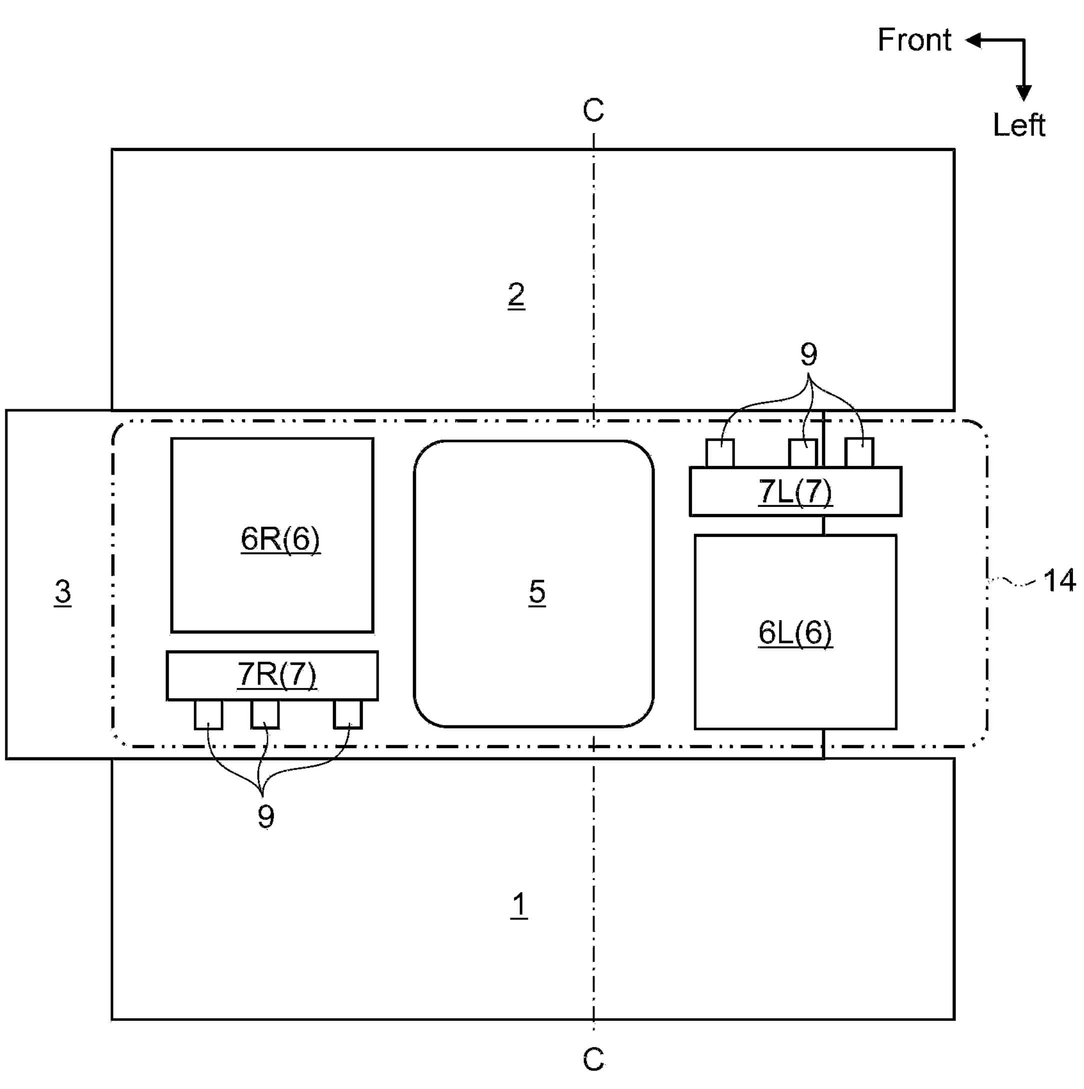
FIG. 4 is a top view illustrating arrangement of components of an inverter that the vehicle drive device of FIG. 1 includes.

As shown in FIG. 4, in this embodiment, the left and the right modules 6L, 6R and the left and the right sensors 7L, 7R are disposed in the depressed portion 8. This means that the inverter 4 of the present embodiment is entirely in the depressed portion 8 or right overhead the depressed portion 8. Inside the depressed portion 8, the left and the right modules 6L, 6R are arranged one on each side (each the front and the rear sides) in the front-rear direction of the capacitor 5, and the left and the right sensors 7L,7R are also arranged one on each side (each of the front and the rear sides) in the front-rear direction of the capacitor 5.

In the present embodiment, the left module 6L and the left sensor 7L, dedicated to the left motor 1, are located on the rear side of the capacitor 5, while the right module 6R and the right sensor 7R, dedicated to the right motor 2 are located on the front side of the capacitor 5. The left sensor 7L is located on the right side of the left module 6L, while the right sensor 7R is located on the left side of the right module 6R. However, the arrangement of the semiconductor module 6 and the current sensor 7 is not limited thereto. Alternatively, the positions of the left and the right modules 6L, 6R may be interchanged, or the positions of the left and the right sensors 7L, 7R may be interchanged.

Figure 5:
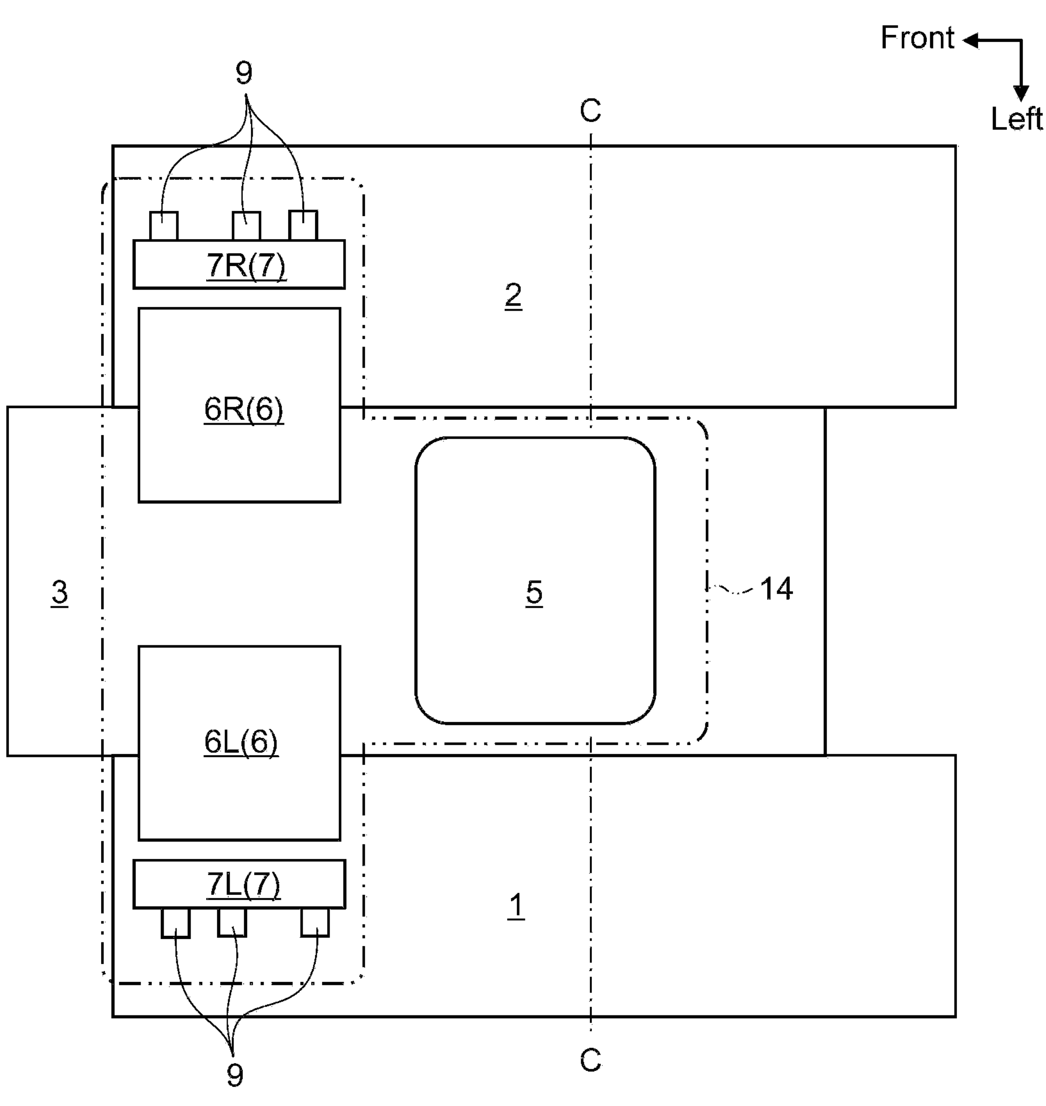
FIG. 5 is a top view illustrating an arrangement of components of an inverter according to a modification (the drawing corresponds to FIG. 4)
Figure 6:
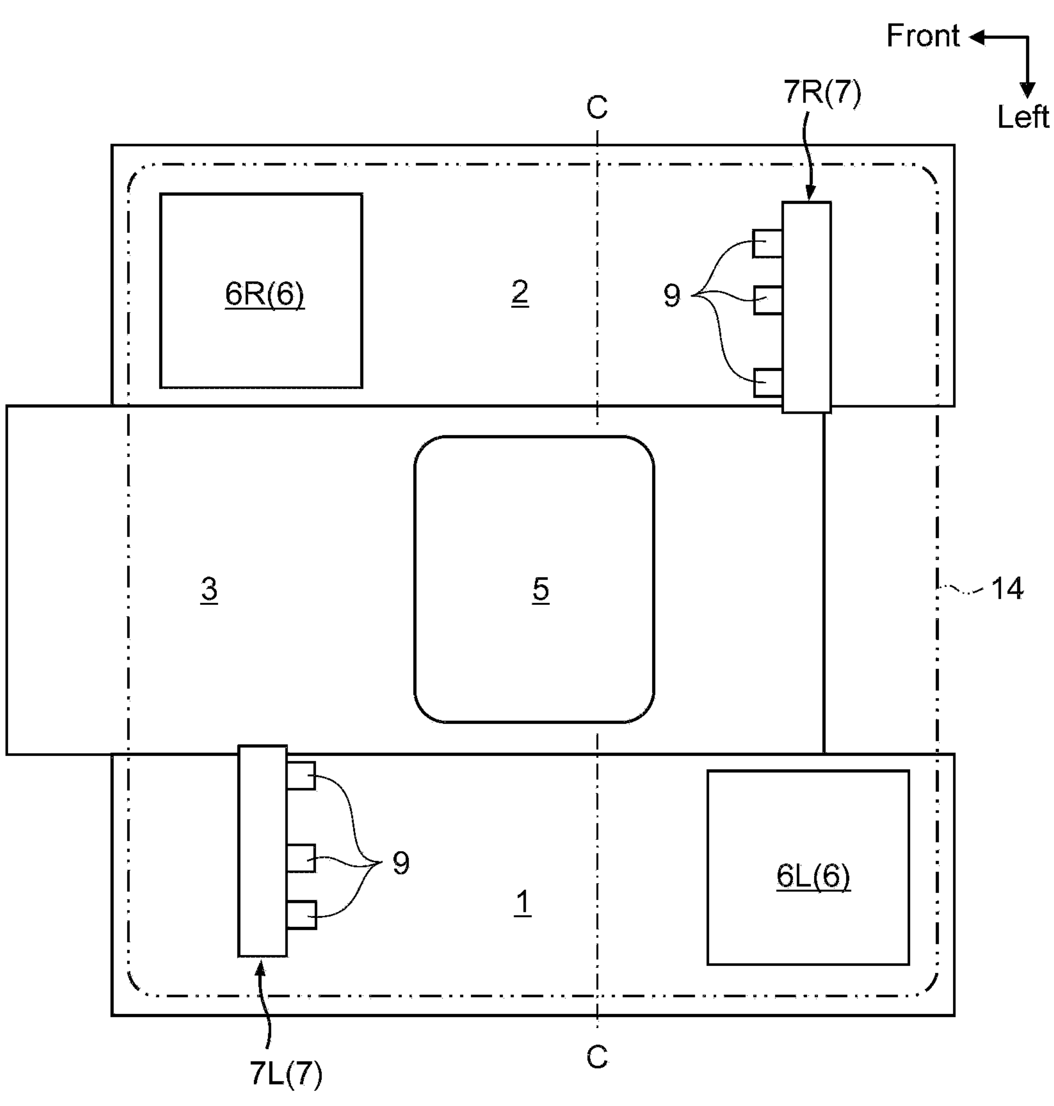
FIG. 6 is a top view illustrating an arrangement of components of an inverter according to another modification (the drawing corresponds to FIG. 4)

Here, FIG. 5 and FIG. 6 show modifications of the arrangement of semiconductor module 6 and the current sensor 7. In the modification, the position of the capacitor 5 is unchanged from that of FIG. 4.

As shown in FIG. 5, the left and the right modules 6L, 6R and the left and the right sensors 7L, 7R may be disposed in either side (i.e., the front side or the rear side) of the front-rear direction of the capacitor 5. As described above, when the gearbox 3 is offset forward with respect to the motor housings 11, 12, the mounting space S is secured more largely on the front side of the rotating shafts C than on the rear side of the rotating shafts C. Therefore, in the modification shown in FIG. 5, both the left and the right modules 6L,6R are disposed on the front side of the capacitor 5. In the structure in which the gearbox 3 is offset rearward with respect to the motor housings 11, 12, since the mounting space S on the rear side of the rotating shafts C is wider, the left and the right modules 6L, 6R and the left and the right sensors 7L, 7R may be arranged on the rear side of the capacitor 5, contrary to the arrangement shown in FIG. 5.

Alternatively, as shown in FIG. 6, the left module 6L and the left sensor 7L may be located on the left side of the capacitor 5 while the right module 6R and the right sensor 7R may be located on the right side of the capacitor 5. In this arrangement, the left and the right modules 6L, 6R are preferably arranged one on the front side of the rotating shafts C and the other on the rear side of the rotating shafts C. Likewise, the left and the right sensors 7L, 7R are preferably arranged one on the front side of the rotating shafts C and the other on the rear side of the rotating shafts C. Further, it is more preferable that the left module 6L and the left sensor 7L are arranged on respective different sides (the front side and the rear side) in the front-rear direction of the rotating shaft C of the left motor 1, while the right module 6R and the right sensor 7R are arranged on respective different sides (the front side and the rear side) in the front-rear direction of the rotating shaft C of the right motor 2.

In the modification of FIG. 6, the left module 6L is located on the rear side of the rotating shaft C of the left motor 1 while the left sensor 7L is located on the front side of the rotating shaft C of the left motor 1. In addition, the right module 6R is located on the front side of the rotating shaft C of the right motor 2 while the right sensor 7R is located on the rear side of the rotating shaft C of the right motor 2. As described above, in the modification of FIG. 6, the positions of semiconductor module 6 and the current sensor 7 along the front-rear direction are interchanged (diagonally arranged) on the left and the right sides of the capacitor 5.

The inverter case 14 is shaped according to the arrangement of the capacitor 5, the semiconductor module 6 and the like so as to be able to accommodate the components of the inverter 4. For example, in the modification of FIG. 5, the inverter case 14 is in the form of a T-shape when seen from above, and in the modification of FIG. 6, the inverter case 14 is in the form of a substantial square when seen from above. As shown in FIGS. 1 to 4, in this embodiment, since both capacitor 5 and the semiconductor module 6 are disposed in the depressed portion 8, the inverter case 14 has a shape corresponding to the shape of the depressed portion 8 when seen from above, that is, a substantially rectangular shape longer in the front-rear direction when seen from above.

Figure 7:
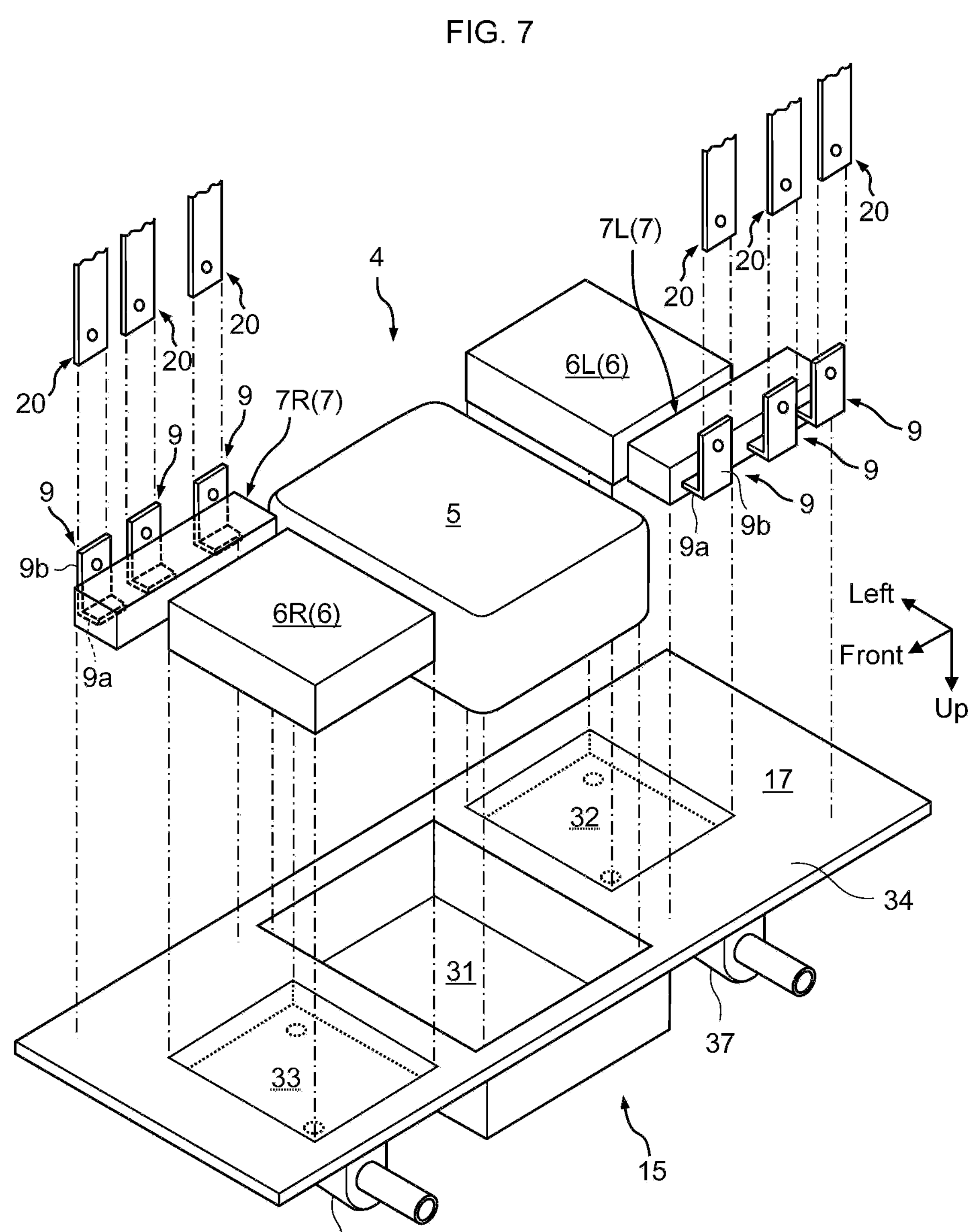
FIG. 7 is an exploded perspective view illustrating an internal structure of the inverter of FIG. 4 and is an upside-down drawing.

As shown in FIGS. 2 and 7, the capacitor 5, the semiconductor module 6, and the current sensor 7 are all attached to the lower surface 17 (hereinafter, also referred to as "cover lower surface 17") of the cover 15. The cover lower surface 17 is an inner surface that faces the tray unit 16 (downward) in a state where the cover 15 is attached to the tray unit 16. The capacitor 5, the semiconductor module 6, and current sensor 7 all attached to the cover lower surface 17 are accommodated in the tray unit 16, being suspended from the cover lower surface 17.

As shown in FIGS. 1 and 7, the cover 15 of the present embodiment includes a flat plate portion 34 attached to a circumference of the tray unit 16, a bulging portion 31 formed in a shape bulging upward from the flat plate portion 34 and accommodating the capacitor 5, and a cooling path 30 through which a coolant to cool the semiconductor module 6 flows. The bulging portion 31 has a shape bulging upward at the center portion (center in the front-rear direction) of the cover 15. The capacitor 5 is fixed at a position corresponding to the bulging portion 31 among the cover lower surface 17 so as to be suspended from the bulging portion 31.

The cover 15 of the present embodiment further includes two raised portions 32,33 each bulging upward on one of the sides of the front-rear direction of the bulging portion 31. Each of the raised portions 32,33 has a bulging shape having a smaller size in the up-down direction (i.e., a smaller bulging amount from the flat plate portion 34) than that of bulging portion 31. The two raised portions 32,33 each incorporate therein a cooling path (not illustrated) that cools corresponding one of the left and the right modules 6L, 6R, and the left and the right modules 6L, 6R are disposed right under the raised portions 32,33, respectively. The left and the right module 6L, 6R are fixed at positions corresponding to the raised portions 32,33 among the cover lower surface 17, respectively, so as to be suspended from the flat plate portion 34.

The left and the right sensors 7L, 7R are attached to the cover lower surface 17 so as to be suspended from the cover 15 at positions adjoining the left and the right modules 6L, 6R, respectively.

Figure 8:
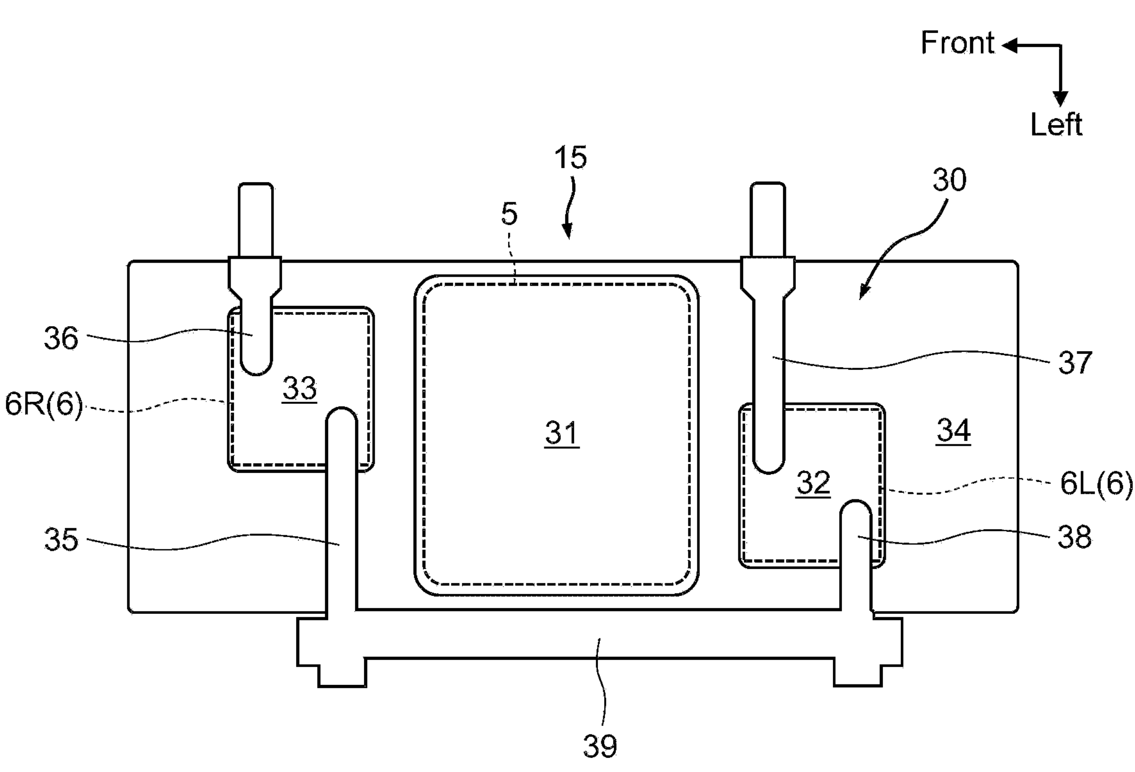
FIG. 8 is a top view illustrating a cooling path of the inverter illustrated in FIG. 4.

As shown in FIGS. 1 and 8, the cooling path 30 is integrated with the cover 15 and has a tubular shape bulging upward from the flat plate portion 34. Inside the cooling path 30, a hollow portion that serves as a flow path of the coolant is provided. The cooling path 30 of the present embodiment includes a front supply path 35 and a front discharge path 36 connected to the cooling path in the front raised portion 33, a rear supply path 37 and a rear discharge path 38 connected to the cooling path in the rear raised portion 32, and a connecting path 39 connecting the front supply path 35 to the rear discharge path 38 to each other.

The two supply paths 35,37 and the two discharge paths 36,38 all extend along the left-right direction. The front supply path 35 extends leftward from the front raised portion 33, while the front discharge path 36 extends rightward from the front raised portion 33. On the other hand, the rear supply path 37 extends rightward from the rear raised portion 32, while the rear discharge path 38 extends leftward from the rear raised portion 32. The connecting path 39 is disposed on the left side of the bulging portion 31 and extends along the front-rear direction.

The cooling path 30 is formed on the flat plate portion 34 so as to overlap the bulging portion 31 when seen from a direction perpendicular to the up-down direction. In other words, the position of the cooling path 30 in the up-down direction is set to match (or be included in) the position of the bulging portion 31 in the up-down direction. In this embodiment, the cooling path 30 is formed such that the two supply paths 35,37 and the two discharge paths 36,38 overlap the bulging portion 31 when seen from the front-rear direction, and the connecting path 39 overlaps the bulging portion 31 when seen from the left-right direction.

The coolant supplied from the outside of the inverter 4 to the rear supply path 37 is supplied from the rear supply path 37 to the cooling path in the rear raised portion 32, cools the right module 6R via a non-illustrated heat sink, and then is discharged to the rear discharge path 38. The coolant is then supplied to the front supply path 35 through the connection path 39. The coolant supplied to the front supply path 35 is supplied from the front supply path 35 to the cooling path in the front raised portion 33, cools the left module 6L via a non-illustrated heat sink, and then is discharged to the front discharge path 36. Then, the coolant is discharged from the front discharge path 36 to the outside of the inverter 4.

As described above, the cooling path 30 of the present embodiment has a structure in which the rear discharge path 38 and the front supply path 35 are connected in series by the connecting path 39. Alternatively, the cooling path 30 may be configured such that the front supply path 35 and the front discharge path 36 connected to the cooling path in the front raised portion 33 and the rear supply path 37 and the rear discharge path 38 connected to the cooling path in the rear raised portion 32 are connected in parallel. Further alternatively, the connecting path 39 integrated with the cover 15 may be replaced with a structure in which the front supply path 35 and the rear discharge path 38 are connected to each other by a tube (not illustrated) formed separately from the cover 15.

As shown in FIG. 7, the inverter 4 of the present embodiment includes terminals 9 formed bent downward from a side of the cover lower surface 17 into an L-shape. Three terminals 9 are provided at positions adjacent to each of the left sensor 7L and the right sensor 7R. The three terminals 9 adjoining the left sensor 7L are connected to busbars 20 extending from the left motor 1 (one of the left and the right motors 1,2) and serve as an electricity supply line of a three-phase AC to the left motor 1. Similarly, the three terminals 9 adjoining the right sensor 7R are connected to busbars 20 extending from the right motor 2 (one of the left and the right motors 1,2) and serve as an electricity supply line of a three-phase AC to the right motor 2.

Each terminal 9 has a base portion 9_a_ extending from a side of the current sensor 7 in the left-right direction, and a connector portion 9_b_ extending from the base 9_a_ downward (bent at 90 degrees). The connector portion 9_b_ is arranged in a posture along the up-down direction and is connected to a busbar 20 extending upward from each of the motors 1,2.

Figure 9:
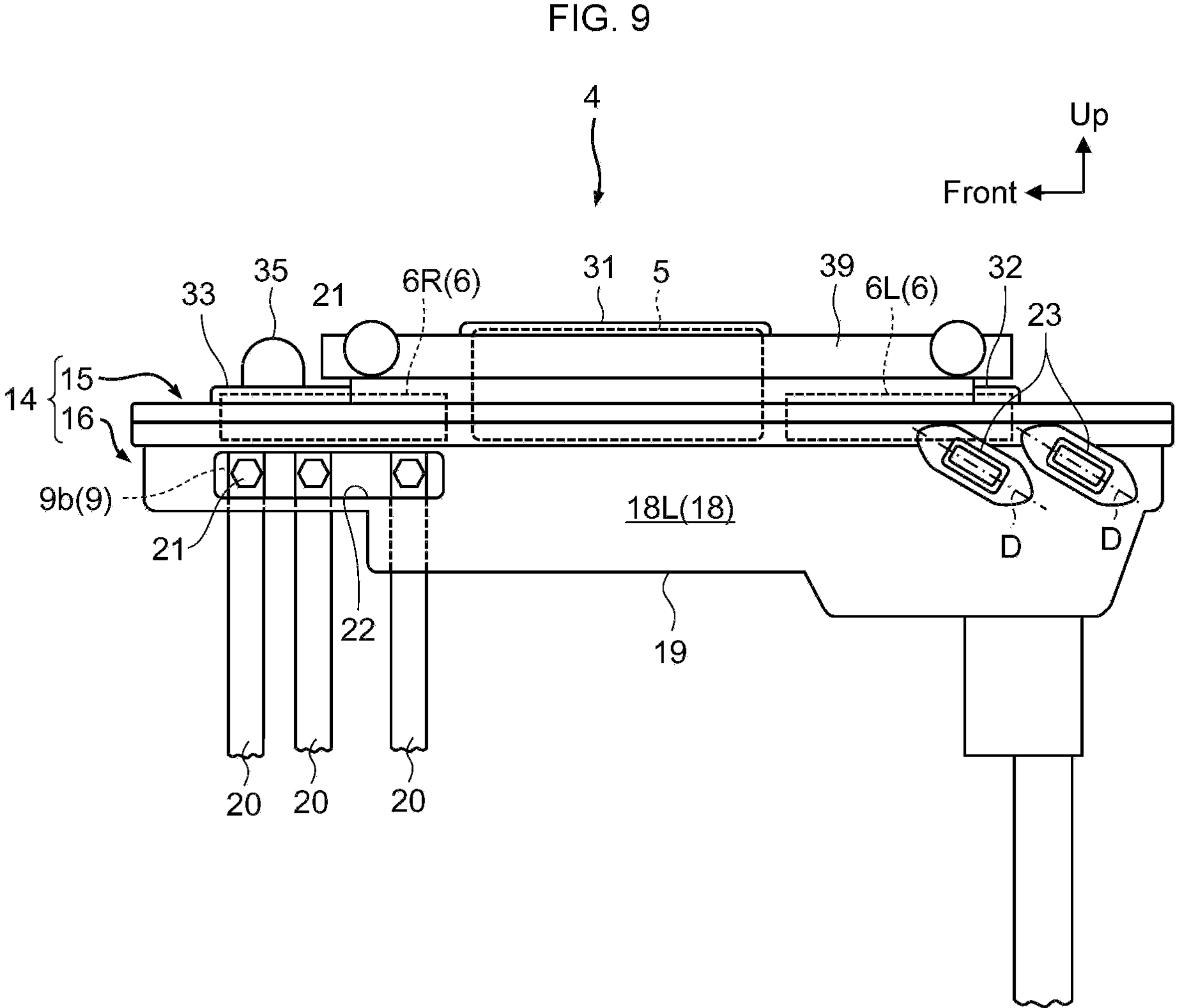
FIG. 9 is a left-side view illustrating the inverter of FIG. 4.

As shown in FIG. 9, the tray unit 16 is formed into a container shape having an internal space capable of accommodating, for example, the capacitor 5 and the semiconductor module 6 suspended from the cover lower surface 17. Side surface portions 18 forming the internal space of tray unit 16 are provided with operation through-holes 22 for connecting each terminal 9 to a busbar 20, and connectors 23 connected with external wires. The operation through-holes 22 and the connectors 23 of the present embodiment are both formed on, among the side surface portions 18, the left surface portion 18L and the right surface portion 18R (see FIG. 2) facing the left-right direction.

The operation through-hole 22 is provided to penetrate each of the front portion of the left surface portion 18L and the rear portion of the right surface portion 18R so as to coincide with the position of the terminals 9. The operation through-hole 22 is an aperture through which a tool is inserted when a fastening member 21 provided to a connecting portion between a terminal 9 and a busbar 20 is to be fastened. In the present embodiment, it is assumed that each operation through-hole 22 is in a rectangular shape. However, the shape of the operation through-hole 22 is not particularly limited.

The connector portion 9_b_ of a terminal 9 is disposed at a position adjoining the operation through-hole 22 in the internal space of tray unit 16. Further, the busbar 20 is passed through a bottom through-hole (not illustrated) provided to penetrate the bottom surface portion 19 of the tray unit 16, and is disposed at a position adjoining the operation through-hole 22 in the internal space of the tray unit 16, and is superimposed on the connector portion 9*b* of the terminal 9. The connector portion 9*b* of the terminal 9 and the busbar 20 are fastened to each other with a fastening member 21 in the internal space of tray unit 16 using a tool inserted from the operation through-hole 22.

The connector 23 is, for example, an electric component that connects a wire for a low-voltage signal. In the present embodiment, two connectors 23 are provided at each of the rear portion of the left surface portion 18L and the front portion of the right surface portion 18R. Each connector 23 in a thin strip shape and has a shape of longitudinal direction D inclined with respect to the front-rear direction and the up-down direction. The specific arrangement and the number of the connectors 23 are not limited to those shown here. The connectors 23 may be provided on a side surface portion 18 except for the left surface portion 18L and the right surface portion 18R, or may be omitted from the tray unit 16.

2. Action and Effect (1) As shown in FIG. 4, in the inverter 4 described above, the capacitor 5 is attached to the cover lower surface 17 and is disposed in depressed portion 8, and the semiconductor module 6 is attached to the cover lower surface 17 and is disposed at a position that differs from the capacitor 5 and the rotating shafts C when seen from above. As described above, by arranging the capacitor 5 having the largest thickness among the components of the inverter 4 in the depressed portion 8, the capacitor 5 can be compactly mounted while the depressed portion 8 (space between the motors 1,2) is efficiently utilized. Further, since the semiconductor module 6 does not overlap the capacitor 5 and the rotating shafts C when seen from above, the size of the up-down direction of the inverter 4 can be made compact.

Furthermore, the "suspended layout" which means that the capacitor 5 and the semiconductor module 6 are attached to the cover lower surface 17 makes it possible to efficiently use the space and omit a base plate which is separated from the cover 15 as compared with a structure that attaches the capacitor 5 and the semiconductor module 6 to such a base plate. In other words, since the cover 15 is provided with also the function of the base plate, the number of components can be reduced, and the space can be further saved. Accordingly, the vehicle drive device 10 can compactly mount the inverter 4 in the limited mounting space S. This can reduce the size of the vehicle drive device 10.

In the present embodiment, the current sensor 7 is also attached to the cover lower surface 17 and is disposed at a position different from the capacitor 5, the semiconductor module 6 and the rotating shafts C when seen from above. As the above, since the current sensor 7, which is one of the components of the inverter 4, does not overlap with any of the capacitor 5, the semiconductor module 6, and the rotating shafts C in a top view, the vertical dimension of inverter 4 can be made further compact. In addition, by attaching also the current sensor 7 to the cover lower surface 17 in the "suspended layout" as well as the capacitor 5 and the semiconductor module 6, it is possible to further save the space since the space can be efficiently utilize the space and also the base plate can be omitted.

(2) Both the left and right modules 6L,6R are disposed in the depressed portion 8 and are disposed one on each of the sides in the front-rear direction with respect to the capacitor 5. As described above, by arranging both the capacitor 5 and the left and the right modules 6L, 6R serving as the components of the inverter 4 in the depressed portion 8, the size in the up-down direction of the vehicle drive device 10 can be made further compact. Further, by sandwiching the capacitor 5 between the left and the right modules 6L,6R, the units (e.g., assemblies including the motor housings 11,12 and the semiconductor modules 6L, 6R and the like, and the wires from the motors 1,2) for the left and the right motors 1,2 can be shared by the motors. This contributes to simplifying and cost reduction of the assembly operation of the vehicle drive device 10.

Further, in the present embodiment, since the entire inverter 4 is disposed in the depressed portion 8, the size in the up-down direction of the vehicle drive device 10 can be made further compact.

(3) If the gearbox 3 is offset downward and forward with respect to the left and the right motor housings 11, 12, the mounting space S is reserved largely on the forward side of the rotating shafts C of the motors 1,2. Therefore, in the modification shown in FIG. 5, the left and the right modules 6L, 6R are both disposed on the front side of the capacitor 5. In this way, by setting the arrangement of the left and the right modules 6L, 6R in accordance with the offsetting direction of the gearbox 3 with respect to the motor housings 11,12, it is possible to enhance the easiness (degree of freedom of the posture) in arranging the left and the right modules 6L, 6R while making more efficiently use of the mounting space S. In addition, if, in the inverter 4, the components (e.g., the current sensor 7) except for the semiconductor module 6 are disposed on the front side of the capacitor 5, the requirement of disposing components on the rear side of the capacitor 5 can be eliminated, which contributes to size reduction of the rear portion.

If the gearbox 3 is offset downward and rearward with respect to the motor housings 11, 12, the mounting space S is reserved largely on the rear side of the rotating shafts C of the motors 1,2. Therefore, this structure can obtain the same action and effects as the above by arranging the left and the right modules 6L, 6R on the rear side with respect to the capacitor 5 (arrangement reversing the front-rear arrangement of the modification shown in FIG. 5).

(4) On the other hand, in the modification shown in FIG. 6, the left module 6L is arranged on a left side of the capacitor 5 while the right module 6R is arranged on a right side of the capacitor 5. In this way, by disposing the left module 6L used for the left motor 1 on the left side of the capacitor 5, the left module 6L and the left motor 1 can be made into a unit (assembled). Similarly, by disposing the right module 6R used for the right motor 2 on the right side of the capacitor 5, the right module 6R and the right motor 2 can be made into a unit (assembled). Further, making each unit of the left and the right motors 1,2 to be common can contribute to simplifying and cost reduction of the assembly operation of the vehicle drive device 10.

Further, in the modification shown in FIG. 6, the left module 6L and the left sensor 7L are disposed one on each of the front and the rear sides in the front-rear direction with respect to the rotating shaft C of the left motor 1, while the right module 6R and the right sensor 7R are disposed one on each of the front and the rear sides in the front-rear direction with respect to the rotating shaft C of the right motor 2. As described above, separately arranging the semiconductor module 6 and the current sensor 7 on the front and the rear sides of the rotating shafts C can easily avoid interference between components.

In addition, in the modification shown in FIG. 6, the positions of the semiconductor module 6 and the current sensor 7 along the front-rear direction are interchanged on the left and the right sides of the capacitor 5. Specifically, on the left side of the capacitor 5 (unit of the left motor 1), the left sensor 7L is disposed on the front side of the left module 6L (one side in the front-rear direction), while on the right side of the capacitor 5 (unit of the right motor 2), the right sensor 7R is disposed on the rear side of the right module 6R (the other side in the front-rear direction). As described above, symmetrically arranging the semiconductor module 6 and the current sensor 7 of the units of the left and the right motors 1,2 with respect to the front and -rear can made the units of the left and the right motors 1,2 to be common. This contributes to simplifying and cost reduction of the assembly operation of the vehicle drive device 10.

(5) As shown in FIGS. 1 and 7, the cover 15 is provided with the bulging portion 31 that is formed in a shape bulging upward from the flat plate portion 34 and that accommodates the capacitor 5. As described above, by locally projecting the bulging portion 31 that accommodates the capacitor having a large thickness from the flat plate portion 34, the accommodability of the capacitor 5 can be ensured, avoiding increase in the size of the capacitor 5.

(6) As shown in FIGS. 1 and 8, the cooling path 30 for cooling the semiconductor module 6 is formed on the flat plate portion 34 of the cover 15 so as to overlap the bulging portion 31 when seen from a direction perpendicular to the up-down direction. As described above, by arranging the cooling path 30 at the same position (height position) as the bulging portion 31 in the up-down direction, it is possible to effectively utilize a dead space adjoining to bulging portion 31 in a direction perpendicular to the up-down direction. Therefore, the cooling performance of the semiconductor module 6 can be ensured while making the size in the up-down direction of the vehicle drive device 10 more compact.

(7) Since the side surface portion 18 of the tray unit 16 is provided with the connectors 23 connected with external wires, the shape of the cover 15 can be simplified when compared with the case where the connectors 23 are provided on cover 15.

(8) Each connector 23 is in a thin strip shape, is provided on a side surface portion 18 (the left surface portion 18L or the right surface portion 18R) facing the left-right direction, and has a longitudinal direction D inclined with respect to in a front-rear direction. By arranging the connector 23 in such an inclined posture, the size in the front-rear direction of the tray unit 16 can be reduced as compared with a horizontal posture in which the longitudinal direction D matches the front-rear direction. Therefore, the inverter 4 can be made further compact in the front-rear direction. This contributes to further size reduction of the vehicle drive device 10.

Since the longitudinal direction D of a connector 23 of the present embodiment is inclined also with respect to the up-down direction, the dimension in the up-down direction of the tray unit 16 can also be reduced as compared with an upright posture in which the longitudinal direction D matches the up-down direction.

(9) The above inverter 4 is provided with the terminals 9 each bent downward from a side of the cover lower surface 17 into an L-shape, each terminal 9 being connected to the busbar 20 extending from one of the left and the right motors 1,2. In this way, by bending the terminal 9 downward so as to receive the busbar 20, the connection structure of the terminal 9 and the busbar 20 can be made to be compact as compared with a case where the terminal 9 is not bent downward. Therefore, the inverter 4 can be further made compact, which contributes to further size reduction of the vehicle drive device 10.

3. Modification

The above embodiment and the modifications are merely examples, and are not intended to exclude the application of various modifications and techniques not explicitly described in the present embodiment and modifications. The configurations of the present embodiment and the modifications can be variously modified without departing from the scope thereof. Further, the configurations of the present embodiment and the modifications can be selected or omitted as needed, or can be combined as appropriate.

For example, the above embodiment illustrates the vehicle drive device 10 that arranges the gearbox 3 offset downward and forward on the basis of the rotating shafts C of the motors 1,2 when seen from the side. Alternatively, the gearbox 3 may be offset downward and rearward. At least by offsetting the gearbox housing 13 downward with respect to the left and the right motor housings 11,12, arrangement of the inverter case 14 using the depressed portion 8 can be easily accomplished and the inverter 4 can be easily compactly accommodated in the mounting space S. This alternative can achieve the same actions and effects as those of the above embodiment.

The left and the right modules 6L, 6R may be integrated. Specifically, like the capacitor 5, a single semiconductor module 6 may be provided and shared by the left and the right motors 1,2.

The shape of the above cover 15 is exemplary. Further alternatively, the cover 15 may be formed into a flat plate shape not having the bulging portion 31 or the raised portions 32,33, and the cooling path 30 may be omitted by forming a path for cooling separately from the cover 15.

DESCRIPTION OF REFERENCE SIGN

1: Left motor
2: Right motor
3: Gearbox
4: Inverter
5: Capacitor
6: Semiconductor module
6L: Left module
6R: Right module
8: Depressed portion
9: Terminal
10: Vehicle drive device
11: Left motor housing
12: Right motor housing
15: Cover
16: Tray unit
17: Cover lower surface
18: Side surface portion
20: Busbar
23: Connector
30: Cooling path
31: Bulging portion
34: Flat plate portion
C: Rotating shaft
D: Longitudinal direction
S: Mounting space

The invention claimed is:

1. A vehicle drive device comprising:

left and right motors that include respective rotating shafts extending in a left-right direction of a vehicle, are spaced apart in the left-right direction from each other, and drive left and right wheels of the vehicle;

a gearbox that incorporates therein a gear mechanism amplifying torque of the left and right motors and transmitting the amplified torque to the left and right wheels, that is sandwiched between the left and right motors, and that forms, in conjunction with respective motor housings of the left and right motors, a depressed portion depressed downward; and an inverter that is arranged in a mounting space over the left and right motors and the gearbox and that comprises a capacitor smoothing electricity and a semiconductor module including a plurality of switching elements, wherein the inverter includes a tray unit that accommodates the capacitor and the semiconductor module, and a cover that is in a flat-plate shape, is attached to the tray unit, and covers the capacitor and the semiconductor module from above the capacitor and the semiconductor module, the capacitor is attached to a lower surface of the cover and is arranged in the depressed portion, and the semiconductor module is attached to the lower surface of the cover and is displaced from each of the capacitor and the rotating shafts when seen from above.

2. The vehicle drive device according to claim 1, wherein the semiconductor module comprises left and right modules used for the left and right motors, respectively, and the left and right modules are arranged in the depressed portion and are arranged on front and rear sides in a front-rear direction of the capacitor.

3. The vehicle drive device according to claim 1, wherein the semiconductor module comprises left and right modules used for the left and right motors, respectively, the gearbox is offset downward and in either side in a front-rear direction from the left and right motor housings, and the left and right modules are arranged on the either side in the front-rear direction of the capacitor.

4. The vehicle drive device according to claim 1, wherein the semiconductor module comprises left and right modules used for the left and right motors, respectively, the left motor is arranged on a left side of the gearbox and the right motor is arranged on a right side of the gearbox, and the left module is arranged on a left side of the capacitor and the right module is arranged on a right side of the capacitor.

5. The vehicle drive device according to claim 1, wherein the cover includes a flat-plate portion attached to a circumference of the tray unit and a bulging portion bulging upward from the flat-plate portion and accommodating the capacitor therein.

6. The vehicle drive device according to claim 5, wherein the cover comprises a cooling path through which coolant to cool the semiconductor module flows, the cooling path being formed on the flat-plate portion so as to overlap the bulging portion when seen from a direction perpendicular to an up-down direction.

7. The vehicle drive device according to claim 1, wherein the tray unit is provided separately from the gearbox, and a connector is provided on a side surface that defines an internal space of the tray unit, the connector being connected with an external wire.

8. The vehicle drive device according to claim 7, wherein the connector is in a thin strip shape, is provided on the side surface facing the left-right direction, and has a longitudinal direction inclined with respect to a front-rear direction.

9. The vehicle drive device according to claim 1, wherein the inverter further comprises a terminal bent downward from a side of the lower surface into an L-shape, the terminal being connected to a busbar extending from one of the left and right motors.

* * * * *